United States Patent [19]

Migdal et al.

[11] Patent Number: 5,188,745
[45] Date of Patent: Feb. 23, 1993

[54] VITON SEAL COMPATIBLE DISPERSANT AND LUBRICATING OIL COMPOSITION CONTAINING SAME

[75] Inventors: Cyril A. Migdal, Croton-on-Hudson; Theodore E. Nalesnik, Wappingers Falls, both of N.Y.

[73] Assignee: Texaco Inc., White Plains, N.Y.

[21] Appl. No.: 812,485

[22] Filed: Dec. 23, 1991

[51] Int. Cl.$^5$ .......................................... C10M 145/10
[52] U.S. Cl. ............................... 252/47; 252/51.5 R; 525/256; 525/259; 525/375
[58] Field of Search ................ 252/47, 51.5 A, 51.5 R; 525/256, 259, 375

[56] References Cited

U.S. PATENT DOCUMENTS

| | | | |
|---|---|---|---|
| 4,320,019 | 3/1982 | Hayoshi | 252/51.5 A |
| 4,693,838 | 9/1987 | Varma et al. | 252/51.5 A |
| 4,780,228 | 10/1988 | Gardener et al. | 252/51.5 A |
| 4,863,623 | 9/1989 | Nalesnik | 252/51.5 A |

*Primary Examiner*—Jacqueline Howard
*Attorney, Agent, or Firm*—James J. O'Loughlin; Robert B. Burns

[57] ABSTRACT

An additive composition comprising a graft and derivatized copolymer prepared from ethylene and at least one $C_3$–$C_{10}$ alpha-monoolefin and, optionally, a polyene selected from non-conjugated dienes and trienes comprising from about 15 to 80 mole percent of ethylene, from about 20 to 85 mole percent of said $C_3$–$C_{10}$ alpha-monoolefin and from about 0 to 15 mole percent of said polyene having an average molecular weight ranging from about 5,500 to 500,000, which has been reacted with at least one olefinic carboxylic acid acylating agent to form one or more acylating reaction intermediates characterized by having a carboxylic acid acylating function within their structure and reacting said reaction intermediate with a N-(2-aminoalkyl)imidizolidone to form said graft derivatized copolymer, and a lubricating oil composition containing same are provided.

12 Claims, No Drawings

VITON SEAL COMPATIBLE DISPERSANT AND LUBRICATING OIL COMPOSITION CONTAINING SAME

BACKGROUND OF THE INVENTION

This invention relates to a novel multifunctional lubricant additive which is a Viton seal compatible dispersant when employed in a lubricating oil composition. The lower molecular weight species are particularly useful as seal compatible dispersants in single grade lubricating oils while the higher molecular weight species are useful for imparting viscosity index improving properties, dispersancy and seal compatible properties to lubricating oils.

DISCLOSURE STATEMENT

There is extensive art on the use of polymers in lubricating oil compositions. A key objective of a formulator is to incorporate a number of functions for the lubricating oil as an integral part of a single polymer structure. Thus, it is conventional to react a relatively unreactive polymer with a compound that will introduce chemically reactive sites in the polymer chain, a process referred to as grafting. This reacted or grafted polymer may then be further reacted with compounds designed to introduce one or more functions for the lubricating oil on the grafted polymer. The resultant reaction product is referred to as a grafted and derivatized polymer and it may exhibit a number of properties for the lubricating oil with varying degrees of effectiveness.

A variety of polymer backbones may be used to prepare the lubricant additive. Thus, the backbone for the additive may be a polymer, copolymer, terpolymer or a mixture thereof from olefinic hydrocarbons having from 2 to 10 carbon atoms and diolefins having from 5 to 14 carbon atoms. The molecular weight of the backbone polymer may be selected or tailored for specific lubricating oils, i.e., single grade or multigrade, in the latter case providing thickening and viscosity improving properties to the lubricant composition.

A particularly significant problem facing the lubricant manufacturer is that of seal deterioration in the engine. All internal combustion engines are built and assembled with elastomer seals, such as Viton seals. During use, these elastomer seals are susceptible to serious deterioration under engine operating conditions. Deterioration in the Viton seals is believed to be due to attack by the nitrogen-containing dispersant in the lubricating oil resulting in brittleness and cracking of the seals. When this condition occurs, serious lubricant leakage from the engine will develop. A lubricating oil composition that degrades the elastomer seals in an engine is unacceptable to engine manufacturers.

U.S. Pat. No. 3,522,180 discloses a method for the preparation of an ethylene-propylene copolymer substrate effective as a viscosity index improver for lubricating oils.

U.S. Pat. No. 4,026,809 discloses graft copolymers of a methacrylate ester and an ethylene-propylene-alkylidene norbornene terpolymer as a viscosity index improver for lubricating oils.

U.S. Pat. No. 4,089,794 discloses ethylene copolymers derived from ethylene and one or more $C_3$ to $C_{28}$ alpha olefin solution grafted with an ethylenically unsaturated carboxylic acid material followed by a reaction with a polyfunctional material reactive with carboxyl groups, such as a polyamine, a polyol, or a hydroxyamine which reaction product is useful as a sludge and varnish control additive in lubricating oils.

U.S. Pat. No. 4,137,185 discloses a stabilized imide graft of an ethylene copolymer additive for lubricants.

U.S. Pat. No. 4,146,489 discloses a graft copolymer where the backbone polymer is an oil-soluble ethylene-propylene copolymer or an ethylene-propylene-diene modified terpolymer with a graft monomer of C-vinylpyridine or N-vinylpyrrolidone to provide a dispersant VI improver for lubricating oils.

U.S. Pat. No. 4,320,019 discloses a multipurpose lubricating additive prepared by the reaction of an interpolymer of ethylene and a $C_3$-$C_8$ alpha-monoolefin with an olefinic carboxylic acid acylating agent to form an acylating reaction intermediate which is then reacted with an amine.

U.S. Pat. No. 4,357,250 discloses a reaction product of a copolymer and an olefin carboxylic acid via the "ene" reaction followed by a reaction with a monoamine-polyamine mixture.

U.S. Pat. No. 4,382,007 discloses a dispersant-VI improver prepared by reacting a polyamine-derived dispersant with an oxidized ethylene-propylene polymer or an ethylene-propylene diene terpolymer.

U.S. Pat. No. 4,144,181 discloses polymer additives for fuels and lubricants comprising a grafted ethylene copolymer reacted with a polyamine, polyol or hydroxyamine and finally reacted with an alkaryl sulfonic acid.

The disclosures in the foregoing patents which relate to VI improvers and dispersants for lubricating oils are incorporated herein by reference.

An object of this invention is to provide a novel derivatized graft copolymer composition.

Another object of the invention is to provide a lubricant additive effective as a Viton seal compatible dispersant in a lubricating oil composition.

Another object is to provide an effective seal compatible dispersant for a single grade lubricating oil.

A further object is to provide a novel lubricating oil composition containing the graft copolymer additive of the invention, as well as to provide concentrates of the novel additive of invention.

SUMMARY OF THE INVENTION

The novel reaction product of the invention comprises a polymer, copolymer or terpolymer of a $C_2$-$C_{10}$ alpha-monoolefin and, optionally, a non-conjugated diene or triene having a molecular weight ranging from about 5,500 to 500,000 on which has been grafted an ethylenically unsaturated carboxylic function which is then further derivatized with an amine substituted imidizolidone compound represented by the formula:

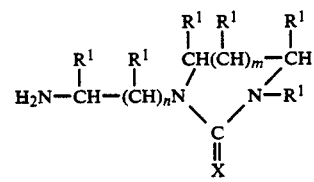

in which $R^1$ in each instance is the same or different and may be H or a branched or straight chain radical having 1 to 24 carbon atoms that can be alkyl, alkenyl, alkoxyl, aralkyl or alkaryl, n has a value from 0 to 12, m has a value of 0 to 2, and X is either O or S.

The novel lubricant of the invention comprises an oil of lubricating viscosity and an effective amount of the novel reaction product. The lubricating oil will be characterized by having Viton seal compatible and dispersant properties in the lower molecular weight ranges and will additionally possess viscosity index improvement properties in the high molecular weight ranges.

Concentrates of the reaction product of the invention are also contemplated.

DETAILED DESCRIPTION OF THE INVENTION

The polymer or copolymer substrate employed in the novel additive of the invention may be prepared from ethylene and propylene or it may be prepared from ethylene and a higher olefin within the range of $C_3$–$C_{10}$ alpha-monoolefins.

More complex polymer substrates, often designated as interpolymers, may be prepared using a third component. The third component generally used to prepare an interpolymer substrate is a polyene monomer selected from non-conjugated dienes and trienes. The non-conjugated diene component is one having from 5 to 14 carbon atoms in the chain. Preferably, the diene monomer is characterized by the presence of a vinyl group in its structure and can include cyclic and bicyclo compounds. Representative dienes include 1,4-hexadiene, 1,4-cyclohexadiene, dicyclopentadiene, 5-ethylidene-2-norbornene, 5-methylene-2-norbornene, 1,5-heptadiene, and 1,6-octadiene. A mixture of more than one diene can be used in the preparation of the interpolymer. A preferred non-conjugated diene for preparing a terpolymer or interpolymer substrate is 1,4-hexadiene.

The triene component will have at least two non-conjugated double bonds, and up to about 30 carbon atoms in the chain. Typical trienes useful in preparing the interpolymer of the invention are 1-isopropylidene-3a,4,7,7a-tetrahydroindene, 1-isopropylidenedicyclopentadiene, dehydro-isodicyclopentadiene, and 2-(2-methylene-4-methyl-3-pentenyl)[2.2.1] bicyclo-5-heptene.

The polymerization reaction to form the polymer substrate may be carried out in the presence of a catalyst in a solvent medium, i.e., solution polymerization. The polymerization solvent may be any suitable inert organic solvent that is liquid under reaction conditions for solution polymerization of monoolefins which is generally conducted in the presence of a Ziegler type catalyst. Examples of satisfactory hydrocarbon solvents include straight chain paraffins having from 5 to 8 carbon atoms, with hexane being preferred. Aromatic hydrocarbons, preferably aromatic hydrocarbons having a single benzene nucleus such as benzene, toluene and the like; and saturated cyclic hydrocarbons having boiling point ranges approximating those of the straight chain paraffinic hydrocarbons and aromatic hydrocarbons described above, are particularly suitable. The solvent selected may be a mixture of one or more of the foregoing hydrocarbons. It is desirable that the solvent be free of substances that will interfere with a Ziegler polymerization reaction.

In a typical preparation of a polymer substrate, hexane is first introduced into a reactor and the temperature in the reactor is raised moderately to about 30° C. Dry propylene is fed to the reactor until the pressure reaches about 40–45 inches of mercury. The pressure is then increased to about 60 inches of mercury and dry ethylene and 5-ethylidene-2-norbornene are fed to the reactor. The monomer feeds are stopped and a mixture of aluminum sesquichloride and vanadium oxytrichloride are added to initiate the polymerization reaction. Completion of the polymerization reaction is evidenced by a drop in the pressure in the reactor.

When the objective is to provide dispersant and seal compatible additive for a single grade motor oil, a backbone polymer of lower molecular weight is used. Broadly, this polymer will have a number average molecular weight from about 5,500 to 25,000 and, more specifically, from 6,000 to 15,000. These lower molecular weight polymers can be prepared by solution polymerization. Alternatively, they can be prepared by taking a high molecular weight polymer and reducing it, as by shearing, to a suitable molecular weight for a single grade lubricating oil.

The reduction of the molecular weight of the starting ethylene copolymer having a molecular weight say about 80,000 to a molecular weight ranging from 5,500 to 25,000 and the grafting of the ethylenically unsaturated carboxylic acid material onto the copolymer may be accomplished simultaneously or it may be accomplished sequentially in any order. If done sequentially, the ethylene copolymer may first be degraded to the prescribed molecular weight and then grafted or, conversely, the grafting may be effected onto the high molecular weight copolymer and the resulting high molecular weight grafted copolymer then reduced in molecular weight. Alternatively, grafting and reduction of the high molecular weight copolymer may be done simultaneously.

Reduction of the molecular weight of a high molecular weight polymer to the prescribed low molecular weight range, whether during grafting or prior to grafting, is conducted in the absence of a solvent or in the presence of a base oil, using a mechanical shearing means. Generally, the ethylene copolymer is heated to a molten condition at a temperature in the range of 250° C. to 450° C. and it is then subjected to mechanical shearing means until the copolymer is reduced to the prescribed molecular weight range. The shearing may be effected by forcing the molten copolymer through fine orifices under pressure or by other mechanical means.

Ethylene-propylene or higher alpha monoolefin copolymers may consist of from about 15 to 80 mole percent ethylene and from about 20 to 85 mole percent propylene or higher monoolefin with the preferred mole ratios being from about 25 to 75 mole percent ethylene and from about 25 to 75 mole percent of a $C_3$–$C_{10}$ alpha monoolefin with the most preferred proportions being from 25 to 55 mole percent ethylene and 45 to 75 mole percent propylene.

Terpolymer variations of the foregoing polymers may contain from about 0.1 to 10 mole percent of a non-conjugated diene or triene.

The polymer backbone may incorporate a variety of olefinic components. For example, the polymer backbone may contain methacrylates, vinylpyrrolidone, styrene copolymer and styrene terpolymers.

The polymer substrate, for example, the ethylene copolymer or terpolymer, is an oil-soluble, substantially linear, rubbery material broadly having a number average molecular weight from about 5,500 to 500,000, with a preferred broad range of 6,000 to 250,000. A preferred molecular weight range for a single grade motor oil is from 6,000 to 15,000. For a multigrade oil, a preferred molecular weight range is from 40,000 to 250,000, a more preferred range being from 50,000 to 150,000, and a most preferred range from about 75,000 to 125,000.

The terms polymer and copolymer are used generically to encompass ethylene copolymers, terpolymers or interpolymers. These materials may contain minor amounts of other olefinic monomers so long as their basic characteristics are not materially changed.

An ethylenically unsaturated carboxylic acid material is next grafted onto the prescribed polymer backbone. These materials which are attached to the polymer contain at least one ethylenic bond and at least one, preferably two, carboxylic acid or its anhydride groups or a polar group which is convertible into said carboxyl groups by oxidation or hydrolysis. Maleic anhydride or a derivative thereof is preferred. It grafts onto the ethylene copolymer or terpolymer to give two carboxylic acid functionalities. Examples of additional unsaturated carboxylic materials include chloromaleic anhydride, itaconic anhydride, or the corresponding dicarboxylic acids, such as maleic acid, fumaric acid and their monoesters.

The ethylenically unsaturated carboxylic acid material may be grafted onto the polymer backbone in a number of ways. It may be grafted onto the backbone by a thermal process known as the "ene" process or by grafting in solution or in solid form using a radical initiator. The free-radical induced grafting of ethylenically unsaturated carboxylic acid materials in solvents, such as benzene, is a preferred method. It is carried out at an elevated temperature in the range of about 100° C. to 250° C., preferably 120° C. to 190° C. and more preferably at 150° C. to 180° C., e.g., about 160° C., in a solvent, preferably a mineral lubricating oil solution containing, e.g., 1 to 50, preferably 5 to 30 weight percent, based on the initial total oil solution, of the ethylene polymer and preferably under an inert environment.

The free-radical initiators which may be used are peroxides, hydroperoxides, and azo compounds, and preferably those which have a boiling point greater than about 100° C. and decompose thermally within the grafting temperature range to provide free radicals. Representative of these free-radical initiators are azobutyronitrile and -2,5-dimethyl-hex-3-yne-2,5 bis-tertiary-butyl peroxide. The initiator is used in an amount of between about 0.005% and about 1% and about 1% by weight based on the weight of the reaction mixture solution. The grafting is preferably carried out in an inert atmosphere, such as under nitrogen blanketing. The resulting polymer intermediate is characterized by having carboxylic acid acylating functions within its structure.

In the solid or melt process for forming a graft polymer, the unsaturated carboxylic acid with the optional use of a radical initiator is grafted on molten rubber using rubber masticating or shearing equipment. The temperature of the molten material in this process may range from about 150° C. to 400° C.

Polymer substrates or interpolymers are available commercially. Particularly useful are those containing from about 40 to about 80 mole percent ethylene units, about 60 to about 20 mole percent propylene units. Examples are "Ortholeum 2052" and "PL-1256" available from E. I. dupont de Nemours and Co. The former is a terpolymer containing about 48 mole percent ethylene units, 48 mole percent propylene units and 4 mole percent 1,4-hexadiene units, having an inherent viscosity of 1.35. The latter is a similar polymer with an inherent viscosity of 1.95. The viscosity average molecular weights of the two are on the order of 200,000 and 280,000, respectively.

The reaction between the polymer substrate intermediate having grafted thereon carboxylic acid acylating function and the prescribed compound is conducted by heating a solution of the polymer substrate under inert conditions and then adding the compound to the heated solution generally with mixing to effect the reaction. It is convenient to employ an oil solution of the polymer substrate heated to 140° C. to 175° C. while maintaining the solution under a nitrogen blanket. The amine-substituted imidizolidone compound is added to this solution and the reaction is effected under the noted conditions.

The following examples illustrate the preparation of the polymer backbone and the novel reaction product additive of the invention.

EXAMPLE I

The Mechanical/Thermal Shearing Preparation of Low Molecular Ethylene-Propylene Copolymer Utilizing an Extruder The ethylene-propylene copolymer (100,000 Number Avg. MW) was chopped and processed through an extruder in a molten state at a temperature near 400° C. Just prior to entering the extruder screw, maleic anhydride and dicumylperoxide was mixed with the molten polymer and the polymer exiting from the die face of the extruder having a number average molecular weight of about 6,000 to 12,000 was grafted with approximately 1.8 molecules maleic anhydride per copolymer molecule. The ethylene-propylene copolymer grafted with approximately 1.8 molecules maleic anhydride per copolymer molecule (1000 g) was dissolved in SNO (solvent neutral oil) 100 upon exit from the extruder resulting in an approximate 50% concentrate in oil.

EXAMPLE II

Synthesis of N-(2-Aminoethyl)imidizolidone

Diethylenetriamine (257.0 g) was charged into a 1000 ml 4-neck flask along with ethylene glycol monomethylether (500.0 g). The reactor was equipped with a mechanical stirrer, thermometer, thermocouple, and nitrogen inlet, dean stark trap and condenser. The stirring was started and urea was slowly added. Then the reaction mixture was heated to 125° C. and maintained 24 hours, the ammonia produced was allowed to escape through the condenser. The solvent was stripped off under vacuum. The product was collected by vacuum distillation (~0.5 mm Hg) at 160° C.–170° C. The product analyzed by GC-MS was found to be 99.5% pure with a MW of 129.4.

EXAMPLE III

Single Grade Motor Oil Dispersant Prepared From Ethylene-Propylene Copolymer Grafted With Approximately 1.8 Molecules Maleic Anhydride Per Copolymer Molecule A 48.6 weight percent mixture of ethylene-propylene copolymer having an average molecular weight of 6,000–12,000 grafted with approximately 1.8 molecules maleic anhydride per copolymer molecule in oil (250.0 g) prepared as described in Example I was charged into a 500 ml 4-neck kettle along with SNO 100 oil (76.0 g). The kettle was equipped with a mechanical stirrer, thermometer, thermocouple, and nitrogen inlet and heated to 160° C. N-(2-aminoethyl)imidizolidone (3.4 g, 0.026 moles) was added along with ethoxylated lauryl alcohol solubilizer and dehazer (9.7 g). The reaction temperature was maintained at 160° C. for six hours. The product (an approximately 37% concentrate) analyzed as follows: % N=0.39 (0.32 calc.), and Kinematic Viscosity=1574 Cst @100° C.

EXAMPLE IV

Preparation of Dispersant From Ethylene-Propylene Copolymer Grafted With Approximately 2.0 Molecules Maleic Anhydride Per Copolymer Molecule A 48.4 weight percent mixture of ethylene-propylene copolymer having an average molecular weight of about 6,000 to 12,000 grafted with approximately 2.0 molecules maleic anhydride per copolymer molecule in oil (1200.0 g) was charged into a 3000 ml 4-neck kettle along with SNO 100 oil (377.9 g) as in Example III above and heated to 180° C. N-(2-aminoethyl)imidizolidone (17.5 g, 0.136 moles) was added along with ethoxylated lauryl alcohol (46.5 g). The reaction temperature was maintained at 180° C. for six hours. The product (an approximately 37% concentrate) analyzed as follows: % N-0.45 (0.35 calc.), and Kinematic Viscosity=1598 cSt @100° C.

EXAMPLE V (Comparative)

Preparation of Dispersant From Ethylene-Propylene Copolymer Grafted With Approximately 1.8 Molecules Maleic Anhydride Per Copolymer Molecule A 48.6 weight percent mixture of an ethylene-propylene copolymer having a molecular weight in the range of about 6,000 to 12,000 grafted with approximately 1.8 molecules maleic anhydride per copolymer molecule in oil (700.0 g) was charged into a 2000 ml 4-neck kettle along with SNO 100 oil (310.1 g) and heated to 160° C. N,N-dimethylaminopropylamine (8.1 g, 0.079 moles) was added along with ethoxylated lauryl alcohol (31.1 g). The reaction temperature was maintained at 160° C. for six hours. The product (an approximately 33% concentrate) analyzed as follows: % N=0.22 (0.21 calc.), and Kinetic Viscosity=583 cSt @100° C.

EXAMPLE VI (Comparative)

Preparation of Dispersant From Ethylene-Propylene Copolymer Grafted With Approximately 1.8 Molecules Maleic Anhydride Per Copolymer Molecule A 48.6 weight percent mixture of ethylene-propylene copolymer grafted with approximately 1.8 molecules maleic anhydride per copolymer molecule in oil (700.0 g) was charged into a 2000 ml 4-neck kettle along with SNO 100 oil (313.4 g) and heated to 160° C., as described in Example V above. N-(3-aminopropyl)morpholine (11.4 g, 0.079 moles) was added along with ethoxylated lauryl alcohol (31.1 g). The reaction temperature was maintained at 160° C. for six hours. The product (an approximately 33% concentrate) analyzed as follows: % N-0.22 (0.21 calc.), and Kinetic Viscosity=586 cSt @100° C.

The following tests demonstrate significant performance properties of the seal compatible additive of the invention when incorporated in a lubricating oil composition:

The Bench Sludge Test

This test is conducted by heating the test oil mixed with synthetic hydrocarbon blowby and a diluent oil at a fixed temperature for a fixed time period. After heating, the turbidity of the resulting mixture is measured. A low percentage turbidity (0 to 20) is indicative of good dispersancy, while a high value (20 to 100) is indicative of an oil's increasingly poor dispersancy. The results obtained with the known and present dispersants are set forth in Table 1 below at percent and 6.5 percent, respectively, by weight concentration in a SAE 30 fully formulated motor oil.

TABLE 1

| Dispersant | Bench Sludge Test Results Rating | |
|---|---|---|
| Example III (6.5%) | 31 | — |
| Example III (4.0%) | 41 | — |
| Example IV (6.5%) | — | 26 |
| Example IV (4.0%) | — | 38 |
| Reference (SG) | 29 | 29 |
| Reference (good) | 35 | 33 |
| Reference (fair) | 51 | 47 |
| Reference (poor) | 107 | 85 |

ASTMS Sequence VE Gasoline Engine Test

The ASTM Sequence VE gasoline engine test is used to evaluate the performance of gasoline engine oils in protecting engine parts from sludge and varnish deposits and valve train wear due to low temperature "stop and go" operation. The test uses a Ford 2.3 liter four-cylinder Ranger truck engine. The engine is cycled through three test stages, requiring four hours to complete, for 288 hours or 72 cycles. The Sequence VE gasoline engine test result shown in Table 2 was run in a single grade fully formulated motor oil.

TABLE 2

| | ASTMS Sequence VE Gasoline Engine Test Results | | | | | | | |
|---|---|---|---|---|---|---|---|---|
| Dispersant | AS[1] | AV | RACS | PSV | % ORC | % OSC | CLW avg | CLW max |
| Example[2] IV | 9.6 | 6.2 | 9.5 | 7.2 | 0.0 | 0.0 | 4.1 | 8.9 |
| Limits | 9.0 min | 5.0 min | 7.0 min | 6.5 min | 15.0 max | 20.0 max | 5 max | 15 max |

[1]AS, AV, RACS, PSV, ORC, OSC, CLW avg, and CLW max denote average sludge, average varnish, rocker arm cover sludge, piston skirt varnish, oil ring clogging, oil screen clogging, cam lobe wear average, and cam lobe wear maximum, respectively.
[2]SAE 30 fully formulated motor oil.

VW (AK-6) Viton Seal Compatibility

The test described below is designed to test the Viton seal compatibility for a crankcase lubricating oil composition containing a nitrogen-containing dispersant. The Viton AK-6 seal is soaked at 302° F. for 168 hours in the oil being tested. The elastomer to oil ratio is 1/80. Then the sample is tested for percent change in elongation, percent change in tensile strength, and the degree of cracking. The weight percent of active dispersant in each oil formulation tested is 2.0. The results shown in Table 3 are the seal compatibility test results for the additive-containing single grade motor oil.

TABLE 3

VW (AK-6) Viton Seal Compatibility Test Results

|  | Examples | | | |
|---|---|---|---|---|
|  | IV | V | VI | Limits |
| % Change in Tensile Strength | −8.0 | −34.2 | −21.3 | +/−20 max |
| % Change in Elongation | −9.0 | −31.6 | −20.9 | +/−25 max |
| Cracks at 120% Elongation | none | none | none | none |

It has also been found that high molecular weight grafted polymers which conventionally exhibit dispersant and viscosity index properties in lubricating oil compositions are further improved with respect to Viton seal compatibility and without the loss of the other properties by reacting them with the prescribed amine substituted imidizolidone of the invention. The following examples illustrate this important feature of this invention.

EXAMPLE VII

Seal Compatible Dispersant Olefin Copolymer (DOCP)

42.0 grams of an ethylene-propylene copolymer having a number average molecular weight of about 80,000 (reference polystyrene standard) grafted with 0.8 weight percent of maleic anhydride was dissolved in 258.0 grams of solvent neutral oil with stirring at 160° C. After the copolymer had dissolved, stirring was continued for a additional hour at 160° C.

0.75 grams of aminoethylimidizolidone was dissolved in 12.9 grams of ethoxylated lauryl alcohol. The aminoethylimidizolidone mixture was added to the polymer oil solution at 160° C. with stirring and the reaction continued for three hours at 160° C. with agitation under a nitrogen blanket and a purge to remove the water formed. The solution of the reaction product was cooled to 100° C. and filtered through a 100 mesh screen.

EXAMPLE VIII

Aminopropylmorpholine/DOCP 74.8 grams of an ethylene-propylene copolymer having a number average molecular weight of about 80,000 (reference polystyrene standard) grafted with 0.8 weight percent of maleic anhydride was dissolved in 441 grams of solvent neutral oil with stirring at 160° C. After the copolymer had dissolved, stirring was continued for an additional hour at 160° C.

1.31 grams of aminopropylmorpholine was dissolved in 21.5 grams of ethoxylated lauryl alcohol. The aminopropylmorpholine mixture was added to the polymer oil solution at 160° C. with stirring and the reaction was continued for three hours at 160° C. with agitation under a nitrogen blanket and a purge to remove the water formed. The solution of the reaction product was cooled and filtered as described in Example VII.

The viscosity index performance of the high molecular weight derivatized additive of the invention was tested in the Bench VC Test in comparison to a similar ethylene-propylene copolymer (EPM), a maleic anhydride grafted but underivatized ethylene-propylene copolymer (MA-EPM) and commercial products. The results are set forth in Table 4 below.

Dispersancy of a lubricating oil is determined relative to three references which are the results from three standard blends tested along with the unknown. The test additives were blended into a formulated oil containing no dispersant. The additive reaction product was employed in the oil at a concentration of 1.20 weight percent polymer solution. The numerical value of the test results decreases with an increase in effectiveness.

TABLE 4

Bench VC Dispersancy Test

| VI Improver | Result[1] |
|---|---|
| Example VII | 43 |
| EPM | >190 |
| MA-EPM (underivatized) | 88 |
| Commercial NVP grafted DOCP | 68 |

The EPM base rubber and molecular weight average aer similar in all Examples in Table 4.
[1]The lower the value the better the performance. Ref. Oils: Excellent 28: Good 37; Poor 100.

The high molecular weight derivatized additive of Example VII exhibited high effective dispersancy properties in the Bench VC Dispersancy Test.

The high molecular weight version of the prescribed additive of the invention was tested for its performance in the Sequence VE Engine Test in comparison to a commercial olefin copolymer and a competitive dispersant olefin copolymer. The results are given in Table 5 below.

TABLE 5

Engine Test Performance

| IV Improver | Commercial OCP | Competitor DOCP[1] | Example VII DOCP |
|---|---|---|---|
| Sequence VE |  |  |  |
| Avg. Sludge | 7.2 | 9.3 | 9.1 |
| Avg. Varnish Piston Skirt Varnish | 3.4 | 5.5 | 6.1 |
| Cam Lobe Wear, mils |  |  |  |
| max. | 15.4 | 21.8 | 7.4 |
| avg. | 5.1 | 2.5 | 8.9 |

[1]DOCP also based on amine derivatized maleic anhydride grafted OCP.

the above results show that the prescribed additive of the invention was very effective in the Sequence VE Engine Test.

The Viton seal compatibility of the high molecular weight grafted and derivatized polymer VI improver additive is set forth in Table 6 below.

TABLE 6

Volkswagon Seal Test Results

| Test | Rubber Test Limits | OCP | Experimental DOCP[1] | | |
|---|---|---|---|---|---|
|  |  |  | APM | DMAPA | AEI |
| VI Improvers (8.5 wt. % in SAE 15W-40) |  |  |  |  |  |
|  |  | AK-6 |  |  |  |
| % Change Rupture Strength | +/−20 | −5.9 | −9.9 | −28.4 | −10 |
| % Change in Elongation | +/−25 | −1.2 | −14.9 | −24.7 | −8.6 |

TABLE 6-continued

| | Rubber Test Limits | Volkswagon Seal Test Results | | | |
|---|---|---|---|---|---|
| | | | Experimental DOCP[1] | | |
| Test | | OCP | APM | DMAPA | AEI |
| Formation of Cracks | None | None | None | None | None |
| | | FP 7501 | | | |
| % Change Rupture Strength | +/−20 | 2.6 | 4.4 | 3.8 | 0.9 |
| % Change in Elongation | +/−25 | −20.4 | −20.4 | 22.9 | −24.1 |
| Formation of Cracks | None | None | None | None | None |
| VI Improvers | | | | | |
| (8.5 wt. % in SNO-130) | | | | | |
| | | AK-6 | | | |
| % Change Rupture Strength | +/−20 | 2.6 | 14.2 | 9.7 | −1.3 |
| % Change in Elongation | +/−25 | −4.6 | 5.3 | 3.8 | 3.8 |
| Formation of Cracks | None | None | None | None | None |
| | | FP 7501 | | | |
| % Change Rupture Strength | +/+20 | 10.2 | 23.0 | 20.6 | 3.4 |
| % Change in Elongation | +/−25 | −17.3 | 13.5 | −21.1 | −19.8 |
| Formation of Cracks | None | None | None | None | None |

[1]DOCPs based on maleic anhydride grafted OCP derivatized with (a) APM, aminopropylmorpholine, (b) DMAPA, dimethyl aminopropylamine, and (c) AEI, aminoethylimidizolidone.

The foregoing data demonstrates the effectiveness of the additive of the invention in lubricating oil compositions. Seal compatibility for both single grade oils and multigrade lubricating oils is substantially enhanced and is essential in the manufacture of an acceptable product.

What is claimed is:

1. An additive reaction product prepared by the steps comprising:
   (A) reacting a polymer prepared from ethylene and at least one $C_3$-$C_{10}$ alpha-monoolefin and, optionally, a polyene selected from non-conjugated dienes and trienes comprising from about 15 to 80 mole percent of ethylene, from about 20 to 85 mole percent of said $C_3$-$C_{10}$ alpha-monoolefin, and from about 0 to 15 mole percent of said polyene and having an average molecular weight ranging from about 5,500 to 500,000 with at least one olefinic carboxylic acid acylating agent to form one or more acylating reaction intermediates characterized by having a carboxylic acid acylating function within their structure, and
   (B) reacting said reaction intermediate in (A) with an amine-substituted imidizolidone compound represented by the formula:

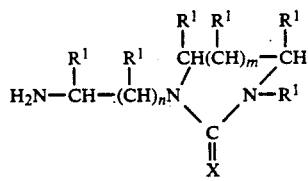

in which $R^1$ in each instance is the same or different and may be H or a branched or straight chain radical having 1 to 24 carbon atoms selected from the group consisting of alkyl, alkenyl, alkoxyl or aralkyl, alkaryl radicals, n has a value from 0 to 12, m has a value of 0 to 3, and X is either O or S.

2. A composition according to claim 1 in which said polymer has an average molecular weight ranging from 6,000 to 250,000.

3. A composition according to claim 1 in which said amine is N-(2-aminoethyl)imidizolidone.

4. A composition according to claim 1 in which said polymer comprises from about 25 to 75 mole percent ethylene and from about 25 to 75 mole percent of a $C_3$-$C_8$ alpha-monoolefin.

5. A composition according to claim 1 in which said olefinic carboxylic acid acylating agent is maleic anhydride.

6. A composition according to claim 1 in which said olefinic carboxylic acid acylating agent is itaconic anhydride.

7. A lubricating oil composition comprising a major amount of an oil of lubricating viscosity and a minor amount effective to impart elastomer seal compatibility of the additive reaction product of claim 1.

8. A lubricating oil composition according to claim 7 in which said amine is N-(2-aminoethyl)imidizolidone.

9. An additive for a single grade motor oil composition according to claim 1 in which said polymer has a molecular weight ranging from about 6,000 to 15,000.

10. An additive according to claim 1 in which said polymer has a molecular weight ranging from about 7,000 to 12,000.

11. An additive for a multigrade motor oil composition according to claim 1 in which said polymer has a molecular weight ranging from about 50,000 to 150,000.

12. An additive for a multigrade motor oil composition according to claim 11 in which said polymer has a molecular weight ranging from about 75,000 to 125,000.

* * * * *